US009767421B2

(12) United States Patent
Saleri et al.

(10) Patent No.: US 9,767,421 B2
(45) Date of Patent: Sep. 19, 2017

(54) DETERMINING AND CONSIDERING PETROLEUM RESERVOIR RESERVES AND PRODUCTION CHARACTERISTICS WHEN VALUING PETROLEUM PRODUCTION CAPITAL PROJECTS

(75) Inventors: Nansen G. Saleri, Houston, TX (US); Robert M. Toronyi, Danville, CA (US); Joseph W. Ault, Moraga, CA (US); Cromwell D. Wong, Houston, TX (US)

(73) Assignee: QRI GROUP, LLC, Houston, TX (US)

( * ) Notice: Subject to any disclaimer, the term of this patent is extended or adjusted under 35 U.S.C. 154(b) by 241 days.

(21) Appl. No.: 13/282,297

(22) Filed: Oct. 26, 2011

(65) Prior Publication Data

US 2013/0110563 A1 May 2, 2013

(51) Int. Cl.
*G06Q 10/06* (2012.01)
(52) U.S. Cl.
CPC .................. *G06Q 10/06* (2013.01)
(58) Field of Classification Search
CPC .................................................. G06Q 10/06
USPC ....................................................... 705/7.11
See application file for complete search history.

(56) References Cited

U.S. PATENT DOCUMENTS

| | | | |
|---|---|---|---|
| 3,035,440 A | 5/1962 | Reed | |
| 5,984,010 A | 11/1999 | Elias et al. | |
| 6,101,447 A * | 8/2000 | Poe, Jr. | 702/13 |
| 7,079,952 B2 | 7/2006 | Thomas et al. | |
| 7,289,942 B2 | 10/2007 | Yang et al. | |
| 7,445,041 B2 | 11/2008 | O'Brien | |
| 7,556,099 B2 | 7/2009 | Arthur et al. | |
| 7,798,219 B1 | 9/2010 | Harnoy | |
| 7,890,264 B2 | 2/2011 | Elphic | |
| 7,963,327 B1 | 6/2011 | Saleri et al. | |
| 8,145,427 B1 | 3/2012 | Saleri et al. | |
| 8,145,428 B1 | 3/2012 | Saleri et al. | |
| 8,195,401 B2 * | 6/2012 | Ella et al. | 702/13 |
| 8,209,202 B2 * | 6/2012 | Narayanan et al. | 705/7.11 |
| 8,880,422 B1 | 11/2014 | Lehmann et al. | |
| 2001/0015133 A1 | 8/2001 | Sakai et al. | |
| 2001/0037983 A1 | 11/2001 | Takahashi et al. | |
| 2002/0013687 A1 | 1/2002 | Ortoleva | |
| 2002/0120429 A1 | 8/2002 | Ortoleva | |
| 2003/0225606 A1 | 12/2003 | Raghuraman et al. | |

(Continued)

OTHER PUBLICATIONS

Slide from Presentation by Inventor Joe Ault (2003).

(Continued)

*Primary Examiner* — Kurtis Gills
(74) *Attorney, Agent, or Firm* — Workman Nydegger

(57) ABSTRACT

Determining a True Value Index™ (TVI™) for a petroleum production capital project provides a novel indicator and metric that is designed to quickly assess the economics of undertaking the petroleum production capital project. The TVI™ can be determined according to the following equation:

TVI=NPV+(β*Reserves)

where,
NPV=Net present value of a project;
β=Reservoir Management Factor (RMF™)=absolute value (sum of Coefficient of Reserves and Coefficient of Production) derived from multivariable correlation=to reflect the market value premium on increased reserves if the producer was public; and
Reserves=Barrels of proven reserves to be created by the project.

20 Claims, 6 Drawing Sheets

(56) References Cited

U.S. PATENT DOCUMENTS

| | | | |
|---|---|---|---|
| 2004/0015376 A1* | 1/2004 | Zhu et al. | 705/7 |
| 2004/0158406 A1* | 8/2004 | Harrison | E21B 49/00 702/13 |
| 2004/0220846 A1* | 11/2004 | Cullick et al. | 705/8 |
| 2005/0038603 A1 | 2/2005 | Thomas et al. | |
| 2005/0149307 A1 | 7/2005 | Gurpiner et al. | |
| 2005/0209912 A1 | 9/2005 | Venningen et al. | |
| 2006/0224369 A1 | 10/2006 | Yang et al. | |
| 2006/0289157 A1 | 12/2006 | Rao | |
| 2007/0016389 A1 | 1/2007 | Ozgen | |
| 2007/0143025 A1 | 6/2007 | Valdez et al. | |
| 2007/0284107 A1 | 12/2007 | Crichlow | |
| 2008/0052097 A1* | 2/2008 | Bouzas et al. | 705/1 |
| 2008/0065363 A1* | 3/2008 | Middya | 703/10 |
| 2008/0091283 A1 | 4/2008 | Balci et al. | |
| 2008/0252898 A1 | 10/2008 | Pfaff | |
| 2008/0262898 A1 | 10/2008 | Tonchev et al. | |
| 2009/0005630 A1 | 1/2009 | Yokoyama et al. | |
| 2009/0037115 A1 | 2/2009 | Magill et al. | |
| 2009/0084545 A1 | 4/2009 | Banerjee et al. | |
| 2009/0133871 A1 | 5/2009 | Skinner et al. | |
| 2009/0313772 A1 | 12/2009 | Talley | |
| 2010/0057418 A1 | 3/2010 | Li et al. | |
| 2010/0082142 A1 | 4/2010 | Usadi et al. | |
| 2010/0204972 A1 | 8/2010 | Hsu et al. | |
| 2010/0300682 A1* | 12/2010 | Thakur et al. | 166/250.01 |
| 2011/0014088 A1 | 1/2011 | Zubrin et al. | |
| 2011/0054869 A1* | 3/2011 | Li et al. | 703/10 |
| 2011/0067443 A1 | 3/2011 | Martinez et al. | |
| 2011/0168391 A1* | 7/2011 | Saleri et al. | 166/250.15 |
| 2012/0101759 A1 | 4/2012 | Rai et al. | |
| 2012/0232865 A1 | 9/2012 | Maucec et al. | |
| 2012/0292055 A1 | 11/2012 | Swist | |
| 2013/0048279 A1 | 2/2013 | Appel et al. | |
| 2013/0110474 A1 | 5/2013 | Saleri | |
| 2013/0110524 A1 | 5/2013 | Saleri et al. | |
| 2013/0110571 A1 | 5/2013 | Saleri et al. | |
| 2013/0151159 A1 | 6/2013 | Pomerantz et al. | |
| 2013/0161502 A1 | 6/2013 | Pomerantz et al. | |
| 2013/0338987 A1 | 12/2013 | Cheng et al. | |

OTHER PUBLICATIONS

Saleri et al., "Engineering Control in Reservoir Simulation: Parts I and II", SPE 18305, 1988.
Saleri et al., "Data and Data Hierarchy", SPE 21369, pp. 1286-1293, Dec. 1992.
Saleri, "Reservoir Performance Forecasting: Acceleration by Parallel Planning", JPT, pp. 652-657, Jul. 1993.
Saleri, "'Learning' Reservoirs: Adapting to Disruptive Technologies", JPT, pp. 57-60, Mar. 2002.
Saleri et al., "The Expanding Role of the Drill Bit in Shaping the Subsurface", JPT, pp. 53-58, Dec. 2003.
Saleri et al., "Shaybah-220: A Maximum-Reservoir-Contact (MRC) Well and Its Implications for Developing Tight-Facies Reservoirs", SPE Reservoir Evaluation & Engineering, pp. 316-320, Aug. 2004.
Saleri, "Reservoir Management Tenets: Why They Matter to Sustainable Supplies", JPT, pp. 28-30, Jan. 2005.
Saleri, "Tenets and Diagnostics in Modern Reservoir Management", 8th International Forum on Reservoir Simulation, Jun. 2005, Stressa, Italy.
Saleri, "The Next Trillion: Anticipating and Enabling Game-Changing Recoveries", JPT, Apr. 2006.
Saleri, "Haradh III: A Milestone for Smart Fields", JPT, Nov. 2006.
Saleri, "Dawn in the Desert: Saudi High Tech Paying Off at Ghawar", Energy Tribune, pp. 15-17, Sep. 2007.
Helman, "The Octopus", Forbes Energy & Genius, pp. 454-451, Nov. 24, 2008.
U.S. Appl. No. 12/392,891, filed Feb. 25, 2009, Office Action dated Dec. 8, 2010.
U.S. Appl. No. 12/392,891, filed Feb. 25, 2009, Notice of Allowance dated Mar. 24, 2011.
U.S. Appl. No. 12/915,278, filed Oct. 29, 2010, Office Action dated Nov. 7, 2011.
U.S. Appl. No. 12/606,027, Oct. 26, 2009, Office Action dated Aug. 10, 2011.
U.S. Appl. No. 12/606,027, Oct. 26, 2009, Final Office Action dated Jan. 19, 2012.
U.S. Appl. No. 12/567,361, filed Sep. 25, 2009, Notice of Allowance dated Feb. 2, 2012.
U.S. Appl. No. 12/567,404, filed Sep. 25, 2009, Notice of Allowance dated Feb. 7, 2012.
U.S. Appl. No. 14/604,330, filed Jan. 23, 2015, Matringe et al.
U.S. Appl. No. 14/604,367, filed Jan. 23, 2015, Matringe.
Batavia, "Front-End Loading for Life Cycle Success", Offshore Technology Conference Paper No. OTC-12980; Published Apr. 2001.
BDM-Oklahoma, Inc., "Feasability Study of Heavy Oil Recovery in the United States", U.S. Department of Energy, Document No. NIPER/BDM-0225; Published Mar. 1995.
Burns et al., "Gas Field Development: Automatic Selection of Locations for New Producing Wells", Society of Petroleum Engineers, Document No. SPE-2429; Published 1969.
Fiksel et al., "Measuring Progress Towards Sustainability Principles, Process, and Best Practices", 1999 Greening of Industry Network Conference Best Practice Proceedings.
Freudenrich, Ph.D., Craig, and Jonathan Strickland, "How Oil Drilling Works" Apr. 12, 2001. HowStuffWorks.com retrieved from WayBack Machine, http://web.archive.org/web/20060418040616/http://science.howstuffworks.com/oil-drilling.htm/printable.
Graf et al., "Candidate Selection Using Stochastic Reasoning Driven by Surrogate Reservoir Models"; Society of Petroleum Engineers, Document No. SPE-136373; SPE Reservoir Evaluation and Engineering; Published Aug. 2011; p. 433-442.
Investopedia.com, "What are leading, lagging, and coincident indicators? What are they for?", http://www.investopedia.com/ask/answers/177.asp, retrieved on Feb. 27, 2012.
Investorwords.com, "lagging indicator", "leading indicator", http://www.investorwords.com/2713/lagging_indicator.html, http://www.investorwords.com/2741/leading_indicator.html.
"The Report of the BP U.S. Refiners Independent Safety Review Panel", Jan. 2007.
Schlumberger.com retrieved from WayBack Machine, http://web.archive.org/web/20071230014516/http://www.slb.com/.
Society of Petroleum Engineers, "Petroleum Resources Management System"; SPE/World Petroleum Council; Published Apr. 2007.
U.S. Appl. No. 12/567,404, filed Sep. 29, 2009, Office Action dated Dec. 8, 2011.
U.S. Appl. No. 12/915,278, filed Oct. 29, 2010, Final Office Action dated Mar. 1, 2012.
U.S. Appl. No. 13/282,282, filed Oct. 26, 2011, Office Action dated Mar. 27, 2014.
U.S. Appl. No. 13/282,315, filed Oct. 26, 2011, Office Action dated Aug. 18, 2014.
U.S. Appl. No. 13/282,272, filed Oct. 26, 2011, Office Action dated Nov. 7, 2014.
U.S. Appl. No. 13/282,282, filed Oct. 26, 2011, Final Office Action dated Dec. 26, 2014.
U.S. Appl. No. 13/282,315, filed Oct. 26, 2011, Office Action dated Feb. 18, 2015.
Ham, Jerry, "Ranking of Texas Reservoirs for Application of Carbon Dioxide Miscible Displacement", Apr. 1996.
Rivas et al., "Ranking Reservoirs for Carbon Dioxide Flooding Processes", 1994.
U.S. Appl. No. 13/282,282, filed Oct. 26, 2011, Office Action dated May 11, 2015.
U.S. Appl. No. 13/282,315, filed Oct. 26, 2011, Final Office Action dated Jun. 25, 2015.
U.S. Appl. No. 13/282,282, filed Oct. 26, 2011, Office Action dated Nov. 20, 2015.
U.S. Appl. No. 13/282,282, filed Oct. 26, 2011, Notice of References cited dated Nov. 30, 2015.
U.S. Appl. No. 14/836,564, filed Aug. 26, 2015, Mondal et al.

(56) References Cited

OTHER PUBLICATIONS

Cordazzo et al., "Interblock Transmissibility Calculation Analysis for Petroleum Reservoir Simulation", Federal University of Santa Catarina, Nov. 2002, pp. 1-18.
Izgec et al, "Quantifying Reservoir Connectivity, In-Place Volumes, and Drainage-Area Pressures during Primary Depletion"; Elsevier, 2009; Journal of Petroleum Science and Engineering, vol. 69; p. 7-17.
Jolley et al., Reservoir Compartmentalization: An Introduction; Reservoir Compartmentalization; The Geological Society of London, 2010; Special Publications vol. 347; pp. 1-8.
Kabir et al., "Diagnosis and Reservoir Compartmentalization from Measured Pressure/Rate Data during Primary Depletion"; Elsevier, 2009; Journal of Petroleum Science and Engineering, vol. 69, pp. 271-282.
McElroy, "Transient Pressure Analysis in Strip Reservoirs with Linear Skin Discontinuities", Stanford University, 1986, p. 1-58.
Smalley et al., "Reservoir Compartmentalization Assessed with Fluid Compositional Data", Society of Petroleum Engineers, Aug. 1994; SPE Reservoir Engineering, vol. 9 Is. 3; p. 175-180.
Yin "Geomechanics-Reservoir Modeling by Displacement Discontinuity-Finite Element Method" University of Waterloo, 2008, p. 1-141.
U.S. Appl. No. 13/282,315, filed Oct. 26, 2011, Office Action dated Mar. 9, 2016.
U.S. Appl. No. 13/282,272, filed Oct. 26, 2011, Office Action dated May 19, 2016.
U.S. Appl. No. 13/282,272, filed Oct. 26, 2011, Final Office Action dated Aug. 23, 2016.
Society of Petroleum Engineers, "Guidelines for the Evaluation of Petroleum Reserves and Resources"; SPE in associate with World Petroleum Congresses and American Association of Petroleum Geologists, 2001; pp. 1-139.
U.S. Appl. No. 13/282,272, filed Oct. 26, 2011, Final Office Action dated Dec. 9, 2015.

* cited by examiner

The Plot Above Shows There Is A Relatively Strong Relationship Between Market Cap And Production At A Point In Time
The Correlation Is Based On A 10 Year Observation For The Producers In The Sample

Summary

| Multiple R | R-Square | Adjusted R-Square | StErr Of Estimate |
|---|---|---|---|
| 0.90 | 0.81 | 0.76 | 130,150.71 |

ANOVA Table

| | Degrees Of Freedom | Sum Of Squares | Mean Of Squares | F-Ratio | P-Value |
|---|---|---|---|---|---|
| Explained | 2.00 | 578,023,546,431.85 | 289,011,773,215.92 | 17.06 | 0.00 |
| Unexplained | 8.00 | 135,513,652,629.16 | 16,939,206,578.64 | | |

Regression Table

| | Coefficient | Standard Error | T-Value | P-Value | Confidence Interval 95% Lower | Upper |
|---|---|---|---|---|---|---|
| Constant | (563,053.63) | 211,171.84 | (2.67) | 0.03 | (1,050,016.78) | (76,090.49) |
| Reserves | 61.39 | 20.51 | 2.99 | 0.02 | 14.08 | 108.70 |
| Production | (47.17) | 311.70 | (0.15) | 0.88 | (765.95) | 671.60 |

Reserves Coefficient 501
Production Coefficient 502

500

DETERMINING AND CONSIDERING PETROLEUM RESERVOIR RESERVES AND PRODUCTION CHARACTERISTICS WHEN VALUING PETROLEUM PRODUCTION CAPITAL PROJECTS

CROSS REFERENCE TO RELATED APPLICATIONS

Not Applicable.

BACKGROUND OF THE INVENTION

1. The Field of the Invention

The invention is in the field of petroleum reservoir asset management, more particularly in the field of petroleum project valuation.

2. The Relevant Technology

Petroleum is a critical fuel source and is the life blood of modern society. There is tremendous economic opportunity in finding and extracting petroleum. Due to a variety of technical and geological obstacles, it is typically impossible to recover all of the petroleum contained in a reservoir. With advancing technologies and increasing economic incentive due to higher crude oil prices, the average petroleum reservoir recovery rate can now approach about 35%. While this represents a significant increase in average total petroleum recovery in recent years, it also means that about 65% of the petroleum found in a typical reservoir remains unrecoverable from an economic and/or technical standpoint.

Given the high cost of exploration, dwindling opportunities to find new petroleum reservoirs, and the rising cost of petroleum as a commodity, there currently exists a tremendous economic opportunity for organizations to significantly increase both short-term and long-term production across their petroleum reservoirs. When determining the value (and thus potential profitability) of a new petroleum project, operators typically consider barrels of P1 (proved developed producing) reserves to be created by the project. However, it can be difficult to determine the true value (and thus the potential profitability) of new petroleum projects. For example, with regard to investing in and determining the value of new petroleum projects, operators often fail to consider current production and other available reserves. These difficulties in turn make it difficult to determine when undertaking a new petroleum project is economically feasible. Further, as technology changes, production rates and proven resources can also change. However, without consideration of these and other types of changes, petroleum project valuations can be less accurate.

While the technology may, in fact, exist to increase current production and/or increase total long-term recovery of an organization's petroleum reservoirs, an impediment to implementing an intelligent long-term plan for maximizing current output, extending the life of each reservoir, and increasing total recovery across reservoirs is inadequate knowledge of where to focus the organization's limited resources for optimal production. For example, while a particular reservoir may underperform relative to other reservoirs, which might lead some to neglect further development of the reservoir, the reservoir may, in fact, contain much larger quantities of recoverable petroleum but be under-producing simply due to poor management. Furthermore, organizations may waste resources developing some reservoirs, in which the production gains achieved are disproportionately small compared to the developmental resources expended. The inability to properly diagnose on which reservoirs to focus further development and resources, and to implement an intelligent recovery plan can result in diminished short-term productivity and long-term recovery across the organization's petroleum reservoirs.

In general, those who operate production facilities typically focus on oil well maintenance at an individual reservoir level, and may even implement the latest technologies for maximizing well output at the reservoir. They fail, however, to understand the total picture of health and longevity of the reservoir, and how the reservoir performs relative to other reservoirs, both on a short-term and on a long-term basis. These difficulties can lead to inaccurate valuations of petroleum projects. For example, assessing a new project, such as, drilling a new well, without considering an operator's overall production and other available reserves can reduce the accuracy of economic indicators with respect to the new project.

BRIEF SUMMARY OF THE INVENTION

The present invention relates to valuing petroleum projects and more particularly to methods, systems, and computer program products for determining and considering petroleum reservoir reserve and production characteristics when valuing petroleum projects. The concept may euphemistically be called True Value Index™ (TVI™). TVI™ is a systematic methodology for accurately determining the true value of a petroleum project (e.g., drilling a new well or increasing productivity of an existing well).

Determining the True Value Index™ (TVI™) is a powerful method for quickly estimating the value of a petroleum project that takes into consideration an operator's existing production and capacity reserves. The types of petroleum projects that can be valued include drilling additional wells, stimulating existing wells, and increasing reservoir contact of existing wells. The TVI™ enables engineers, managers, and investors to efficiently and accurately estimate economic feasibility of implementing certain types of capital projects.

In contrast to conventional methods in which only the value of a petroleum production project is determined, the present invention considers petroleum production and petroleum reserves at a point in time. In general, the TVI™ for a project is related to a Reservoir Management Factor™ (RMF™), a net present value (NPV) for the project, and barrels of proven (e.g., P1) reserves to be created by the project. The RMF™ is an absolute value derived from a multivariable correlation. In some embodiments, the RMF™ is calculated from the sum of an operator's coefficient of reserves plus the operator's coefficient of production.

In general, the dollar dimensioned TVI™ for a project can be defined by the following equation:

$$TVI = NPV + (\beta * Reserves)$$

where,

NPV=Net present value of a project;

$\beta$=Reservoir Management Factor (RMF™)=absolute value (sum of Coefficient of Reserves and Coefficient of Production) derived from multivariable correlation (i.e., to reflect the market value premium on increased reserves if the producer was public; and)

Reserves=Barrels of proven (e.g., P1) reserves to be created by the project.

Thus in general, the dollar dimensioned TVI™ is based on reserves and production numbers, which can be calculated and/or can be accessed from corporate documents, such as, for example, 10K filings. Through statistical analysis, a high correlation between production rate, reserves, and market capitalization has been determined to exist.

A more detailed description of how to determine the true value of a capital project will be described hereafter. Additional details regarding the Reservoir Management Factor™ (RMF™) will also be described hereafter.

The True Value Index™ (TVI™) is an indicator or metric designed to quickly assess the economic feasibility of undertaking a new capital project related to extracting petroleum from a petroleum reservoir. Embodiments of the invention provide management, engineers and investors with an effective new tool to identify opportunities to extract petroleum reserves with well-recognized financial benefits to involved parties. Notwithstanding its simplicity, indeed as a result of its simplified methodology, the present invention provides a revolutionary new tool that can accurately and efficiently assess the economic feasibility of a capital project which, in turn, permits interested parties to devise more effective and intelligent strategies for implementing petroleum extraction.

The True Value Index™ (TVI™) can advantageously be used as part of a more comprehensive reservoir evaluation system and methodology known as Reservoir Competency Asymmetric Assessment™ (or RCAA™), which is discussed more fully below in the Detailed Description.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

Embodiments of the invention relate to the determination of a True Value Index™ (TVI™) for a capital project relating to extraction of petroleum from a reservoir. The True Value Index™ (TVI™) is a novel indicator and metric that is designed to quickly and accurately assess the economic feasibility of undertaking a petroleum related project, such as, for example, drilling one or more additional wells, stimulating one or more existing wells, and/or increasing reservoir contact of one or more existing wells. Embodiments of the invention provide management, engineers and investors with an effective tool to identify opportunities to increase production of a petroleum reservoir with well-recognized financial benefits to involved parties.

The True Value Index™ (TVI™) can be used in conjunction with, and as an important component of, a larger, more comprehensive system for assessing petroleum reservoir competency. One example of a larger, more comprehensive system developed by the inventors is known as Reservoir Competency Asymmetric Assessment™ (or RCAA™), a description of which is set forth in U.S. Pat. No. 7,963,327, issued Jun. 21, 2011, and entitled "METHOD FOR DYNAMICALLY ASSESSING PETROLEUM RESERVOIR COMPETENCY AND INCREASING PRODUCTION AND RECOVERY THROUGH ASYMMETRIC ANALYSIS OF PERFORMANCE METRICS," which is incorporated herein in its entirety by reference.

By way of background, RCAA™ includes several closely interrelated sub-methods or modules that are employed in concert and sequentially. These methods or modules can be used in forming metrics and indicators regarding petroleum reserves that are used as part of the TVI™, and knowledge gained as part of a TVI™ can be further applied to an iterative application of the RCAA™ of the petroleum reserves. The methods or modules are (i) analyzing and diagnosing the specific and unique features of a reservoir (i.e., its "DNA") using targeted metrics, of which the True Value Index (TVI™) can be added or modified so as to function as one of the components, (ii) designing a recovery plan for maximizing or increasing current production and ultimate recovery (e.g., increasing recoverable petroleum reserves) from the petroleum reservoir, (iii) implementing the recovery plan so as to increase current production and ultimate recovery of petroleum from the reservoir, and (iv) monitoring or tracking the performance of the petroleum reservoir using targeted metrics and making adjustments to production parameters, as necessary, to maintain desired productivity and recovery.

RCAA™ and TVI™ each rely on intense knowledge gathering techniques, which can include taking direct measurements of the physics, geology, and other unique conditions and aspects of the reservoir and, where applicable, considering the type, number, location and efficacy of any wells that are servicing, or otherwise associated with, the reservoir (e.g., producing wells, dead wells, and observation wells), analyzing the present condition or state of the reservoir using asymmetric weighting of different metrics, and prognosticating future production, recovery and other variables based on a comprehensive understanding of the specific reservoir DNA coupled with the asymmetric weighting and analysis of the data. In some cases, the gathered information may relate to measurements and data generated by others (e.g., the reservoir manager).

In general, RCAA™ is an assessment process which guides both the planning and implementation phases of petroleum recovery. All hydrocarbon assets carry an individual "DNA" reflective of their subsurface and surface features. RCAA™ is an enabling tool for developing and applying extraction methods that are optimally designed to the specifications of individual hydrocarbon reservoirs. Its main value is assisting in the realization of incremental barrels of reserves and production over and above levels being achieved using standard industry techniques. This, in turn, may reduce long-term capital and operating expenses.

According to one embodiment, implementation of RCAA™ spans six interweaving and interdependent tracks: i) Knowledge Systems; ii) Q6 Surveys; iii) Deep Insight Workshops; iv) Q-Diagnostics; v) Gap Analysis; and vi) Plan of Action. The information gathered from these tracks is integrated using modern knowledge-sharing mediums including web-based systems and communities of practice. While the overall business model of RCAA™ includes both technological and non-technological means for gathering the relevant information, the method cannot be implemented without the use of physical processes and machinery for gathering key information. Moreover, implementing a plan of action involves computerized monitoring of well activity. And enhanced reservoir performance results in a physical transformation of the reservoir itself.

Determining a True Value Index™ (TVI™) similarly involves physical processes and machinery for gathering key information. Converting such information, which relates to both the geological characteristics of the reservoir as well as operational attributes of the petroleum recovery plan, into a True Value Index™ (TVI™) is a transformation of essentially physical data into a diagnostic determination or score of petroleum reservoirs. To the extent that such transformations of data are carried out using a computer system programmed to determine a True Value Index™ (TVI™) from the underlying data, more particularly using a processor and system memory, such a computer system is itself a machine.

Because the subsurface plumbing of the reservoir is not homogeneous, it will often be necessary to statistically weight some data points more than others in order to come up with a more accurate assessment of the reservoir. In some cases, outlier data points may simply be anomalies and can be ignored or minimized. In other cases, outliers that show increased recovery efficiency for one or more specific regions of the reservoir may themselves be the ideal and indicate that extraction techniques used in other, less productive regions of the reservoir may need improvement.

Physical processes that utilize machinery to gather data include, for example, 1) coring to obtain down-hole rock samples (both conventional and special coring), 2) taking down-hole fluid samples of oil, water and gas, 3) measuring initial pressures from radio frequency telemetry or like devices, and 4) determining fluid saturations from well logs (both cased hole and open hole). Moreover, once a plan of action is implemented and production and/or recovery from the reservoir are increased, the reservoir is physically transformed from a lower-producing to a higher-producing asset.

Monitoring the performance of the reservoir before, during and/or after implementation of a plan of action involves the use of a computerized system (i.e., part of a "control room") that receives, analyzes and displays relevant data (e.g., to and/or between one or more computers networked together and/or interconnected by the internet). Examples of metrics that can be monitored include 1) reservoir pressure and fluid saturations and changes with logging devices, 2) well productivity and drawdown with logging devices, fluid profile in production and injection wells with logging devices, and oil, gas and water production and injection rates. Relevant metrics can be transmitted and displayed to recipients using the internet or other network. Web based systems can share such data.

Figure 1:
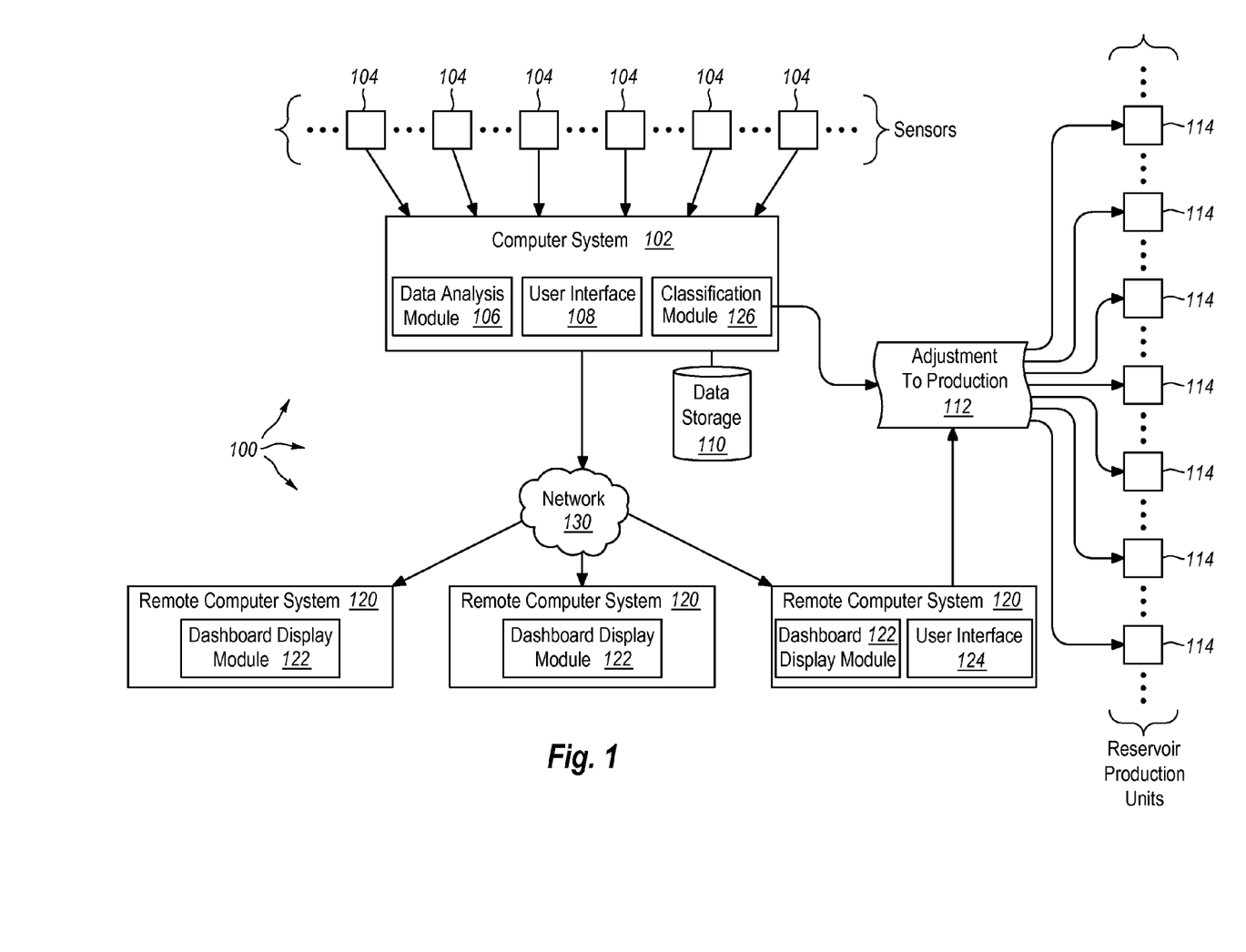
FIG. 1 schematically illustrates exemplary computer-implemented or controlled architecture that can be used to gather, analyze and/or display data gathered from and about a petroleum reservoir.

FIG. 1 illustrates an exemplary computer-implemented monitoring and analysis system 100 that monitors reservoir performance, analyzes information regarding reservoir performance, displays dashboard metrics, and optionally provides for computer-controlled modifications to maintain optimal oil well performance. Monitoring and analysis system 100 includes a main data gathering computer system 102 comprised of one or more computers located near a reservoir and linked to reservoir sensors 104. Each computer typically includes at least one processor and system memory. Computer system 102 may comprise a plurality of networked computers (e.g., each of which is designed to analyze a sub-set of the overall data generated by and received from the sensors 104). Reservoir sensors 104 are typically positioned at producing oil well, and may include both surface and sub-surface sensors. Sensors 104 may also be positioned at water injection wells, observation wells, etc. The data gathered by the sensors 104 can be used to generate performance metrics (e.g., leading and lagging indicators of production and recovery), including those which relate to the determination of the True Value Index™ (TVI™). The computer system 102 may therefore include a data analysis module 106 programmed to establish reservoir metrics from the received sensor data. A user interface 108 provides interactivity with a user, including the ability to input data relating to a real displacement efficiency, vertical displacement efficiency, and pore displacement efficiency. Data storage device or system 110 can be used for long term storage of data and metrics generated from the data, including data and metrics relating to the True Value Index™ (TVI™).

According to one embodiment, the computer system 102 can provide for at least one of manual or automatic adjustment to production 112 by reservoir production units 114 (e.g., producing oil wells, water injection wells, gas injection wells, heat injectors, and the like, and sub-components thereof). Adjustments might include, for example, changes in volume, pressure, temperature, and/or well bore path (e.g., via closing or opening of well bore branches). The user interface 108 permits manual adjustments to production 112. The computer system 102 may, in addition, include alarm levels or triggers that, when certain conditions are met, provide for automatic adjustments to production 112.

Monitoring system 100 may also include one or more remote computers 120 that permit a user, team of users, or multiple parties to access information generated by main computer system 102. For example, each remote computer 120 may include a dashboard display module 122 that renders and displays dashboards, metrics, or other information relating to reservoir production. Each remote computer 120 may also include a user interface 124 that permits a user to make adjustment to production 112 by reservoir production units 114. Each remote computer 120 may also include a data storage device (not shown).

Individual computer systems within monitoring and analysis system 100 (e.g., main computer system 102 and remote computers 120) can be connected to a network 130, such as, for example, a local area network ("LAN"), a wide area network ("WAN"), or even the Internet. The various components can receive and send data to each other, as well as other components connected to the network. Networked computer systems and computers themselves constitute a "computer system" for purposes of this disclosure.

Networks facilitating communication between computer systems and other electronic devices can utilize any of a wide range of (potentially interoperating) protocols including, but not limited to, the IEEE 802 suite of wireless protocols, Radio Frequency Identification ("RFID") protocols, ultrasound protocols, infrared protocols, cellular protocols, one-way and two-way wireless paging protocols, Global Positioning System ("GPS") protocols, wired and wireless broadband protocols, ultra-wideband "mesh" protocols, etc. Accordingly, computer systems and other devices can create message related data and exchange message related data (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), Simple Object Access Protocol ("SOAP"), etc.) over the network.

Computer systems and electronic devices may be configured to utilize protocols that are appropriate based on corresponding computer system and electronic device on functionality. Components within the architecture can be configured to convert between various protocols to facilitate compatible communication. Computer systems and electronic devices may be configured with multiple protocols and use different protocols to implement different functionality. For example, a sensor 104 at an oil well might transmit data via wire connection, infrared or other wireless protocol to a receiver (not shown) interfaced with a computer, which can then forward the data via fast Ethernet to main computer system 102 for processing. Similarly, the reservoir production units 114 can be connected to main computer system 102 and/or remote computers 120 by wire connection or wireless protocol.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code.

II. Determining the True Value Index™ of a Petroleum Project

Figure 2:
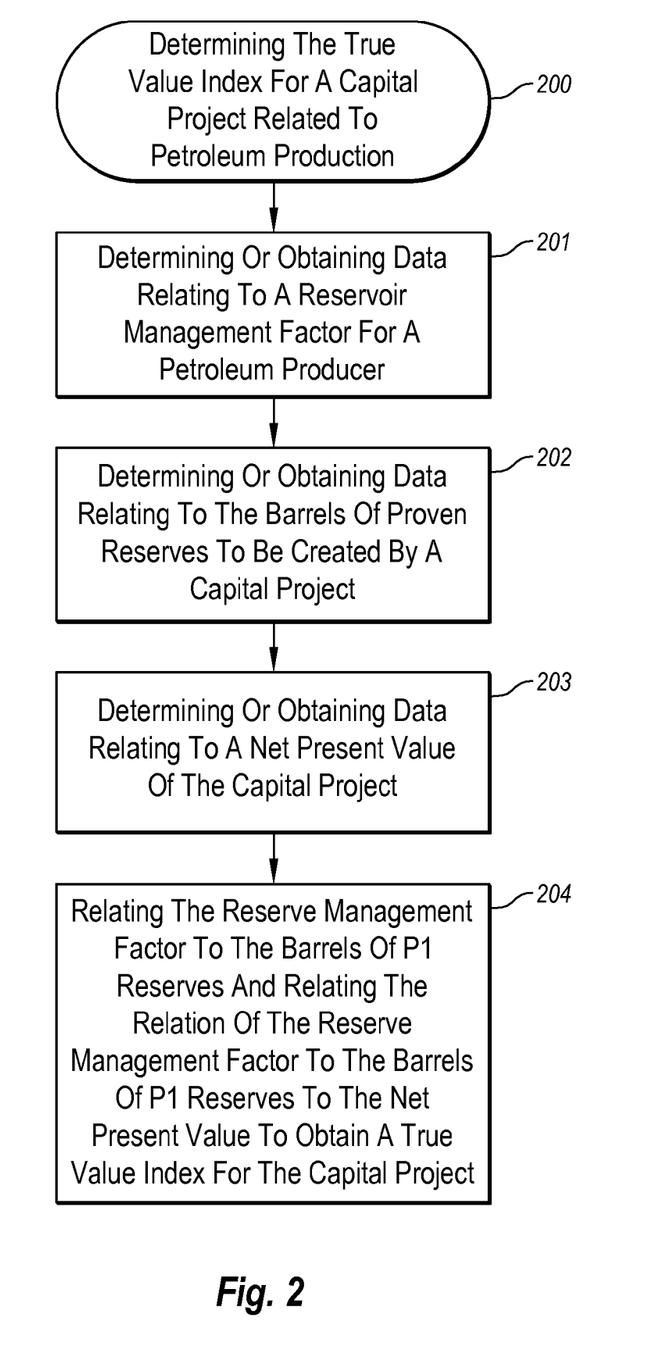
FIG. 2 is a flow diagram that illustrates exemplary acts for determining a True Value Index™ (TVI™) for a capital project related to petroleum production.

FIG. 2 is a flow diagram that illustrates exemplary acts of a process 200 for determining a True Value Index™ (TVI™) for a capital project related to petroleum production, such as, for example, drilling additional wells, stimulating existing wells, and/or increasing reservoir contact of existing wells. Process or sequence 200 includes an act or step 201 of determining or obtaining data relating to a Reservoir Management Factor™ (RMF™) for a petroleum producer ($\beta$). The process or sequence 200 further includes an act or step 202 of determining data relating to the barrels of proven reserves to be created by a capital project (Reserves). The process or sequence 200 further includes an act or step 203 of determining or obtaining data relating to a net present value of the capital project (NPV). The process or sequence 200 further includes an act or step 204 of relating the reserve management factor to the barrels of proven reserves and relating the relation of the reserve management factor to the barrels of proven reserves to the net present value, to obtain the True Value Index™ (TVI™) for the capital project, such as, for example, according to the following equation:

$$TVI = NPV + (\beta * Reserves)$$

where,

NPV=Net present value of a project;

$\beta$=Reservoir Management Factor (RMF™)=absolute value (sum of Coefficient of Reserves and Coefficient of Production) derived from multivariable correlation (i.e., to reflect the market value premium on increased reserves if the producer was public); and Reserves=Barrels of proven reserves to be created by the project.

Petroleum reserves can be classified in a variety of different ways. Reserves can refer to quantities of petroleum claimed to be commercially recoverable by application of development projects to known accumulations under defined conditions. Various criteria are to be satisfied for petroleum to be classified as reserves, such as, for example, discovered through one or more exploratory wells, recoverable using existing technology, commercially viable, and remaining in the ground.

Reserves estimates can have inherent uncertainty, for example, depending on the amount of reliable geological and engineering data available and the interpretation of those data. The relative degree of uncertainty can be expressed by dividing reserves into two principal classifications—"proven" (or "proved") and "unproven" (or "unproved"). Unproven reserves can further be divided into two subcategories—"probable" and "possible"—to indicate the relative degree of uncertainty about their existence. Commonly accepted definitions of these can be based on those approved by the Society of Petroleum Engineers (SPE) and the World Petroleum Council (WPC) in 1997.

Proven reserves are those reserves claimed to have a reasonable certainty (e.g., normally with at least 90% confidence) of being recoverable under existing economic and political conditions, with existing technology. Industry specialists refer to this as P90 (i.e., having a 90% certainty of being produced). Proven reserves are also known in the industry as 1P (or P1). Proven reserves can also be further subdivided into "proven developed" (PD) and "proven undeveloped" (PUD). PD reserves are reserves that can be produced with existing wells and perforations, or from additional reservoirs where minimal additional investment (operating expense) is required. PUD reserves require significant additional capital investment (e.g., drilling new wells) to bring the oil to the surface.

Unproven reserves are based on geological and/or engineering data similar to that used in estimates of proven reserves, but technical, contractual, or regulatory uncertainties preclude such reserves being classified as proven. They are sub-classified as probable and possible. Probable reserves are attributed to known accumulations and claim a 50% confidence level of recovery. Industry specialists refer to them as P50 (i.e., having a 50% certainty of being produced). These reserves are also referred to in the industry as 2P (P2) (proven plus probable).

Possible reserves are attributed to known accumulations that have a lower chance of being recovered than probable reserves. This term is often used for reserves which are claimed to have at least a 10% certainty of being produced (P10). Reasons for classifying reserves as possible include varying interpretations of geology, reserves not producible at commercial rates, uncertainty due to reserve infill (seepage from adjacent areas), and projected reserves based on future recovery methods. They are referred to in the industry as 3P (or P3) (proven plus probable plus possible).

Figure 3:
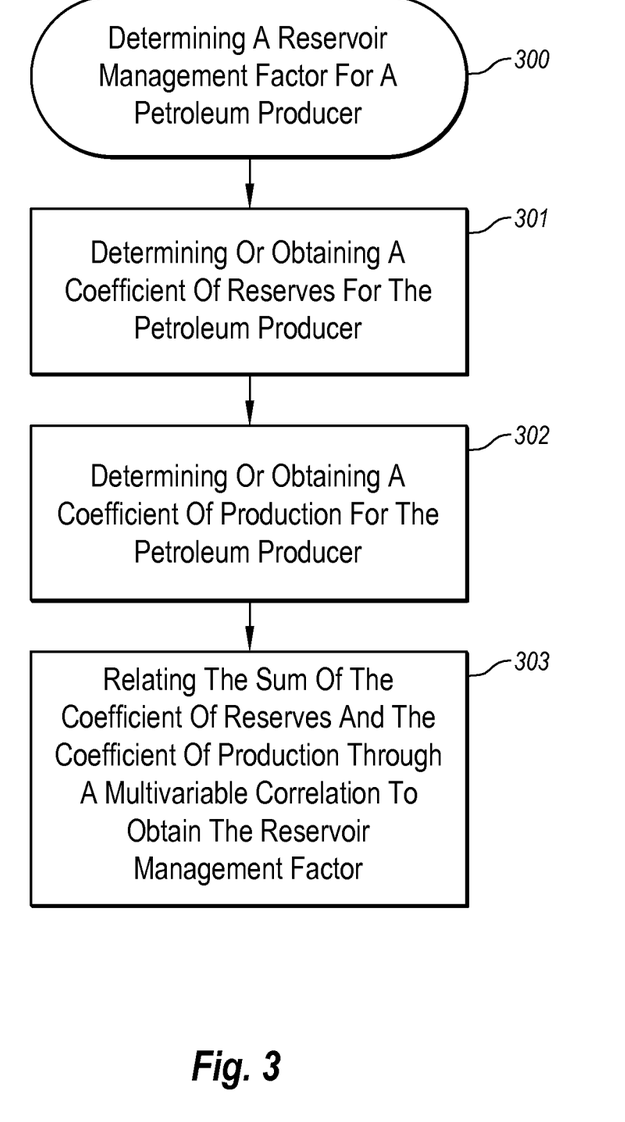
FIG. 3 is a flow diagram that illustrates exemplary acts for determining a Reservoir Management Factor™ (RMF™) for a petroleum producer.

In general, a Reservoir Management Factor™ (RMF™ or β) is a statistically driven value with a high correlation to a producer's market capitalization that also captures the effect on market value for a capital project. FIG. 3 is a flow diagram that illustrates exemplary acts in a process 300 for determining a Reservoir Management Factor™ (RMF™) for a petroleum producer. Process or sequence 300 includes an act or step 301 of determining or obtaining a coefficient of reserves for the petroleum producer. The process or sequence 300 further includes an act or step 302 of determining or obtaining a coefficient of production for the petroleum producer. The process or sequence 300 further includes an act or step 303 of relating the sum of the coefficient of reserves and the coefficient of production through a multivariable correlation to obtain a Reservoir Management Factor™ (RMF™ or β) for the petroleum producer such as, for example, according to the following equation:

β=sum of regression coefficients=sum of(reserves coefficient,production coefficient)

wherein,
reserves coefficient=the coefficient of the petroleum producer's reserves; and
production coefficient=the coefficient of the petroleum producer's production.

Reserves coefficient and production coefficient can determined by using statistical methods on historical data for petroleum producers. In general, there exists a relatively high correlation (e.g., >0.70) between reserves, production, and market capitalization. Reserves and production numbers can be determined from measurement data taken in accordance with sensors 104. Alternatively, at least some reserves and production numbers can be obtained from corporate filings, such as, for example, 10K filings.

Figure 4A:
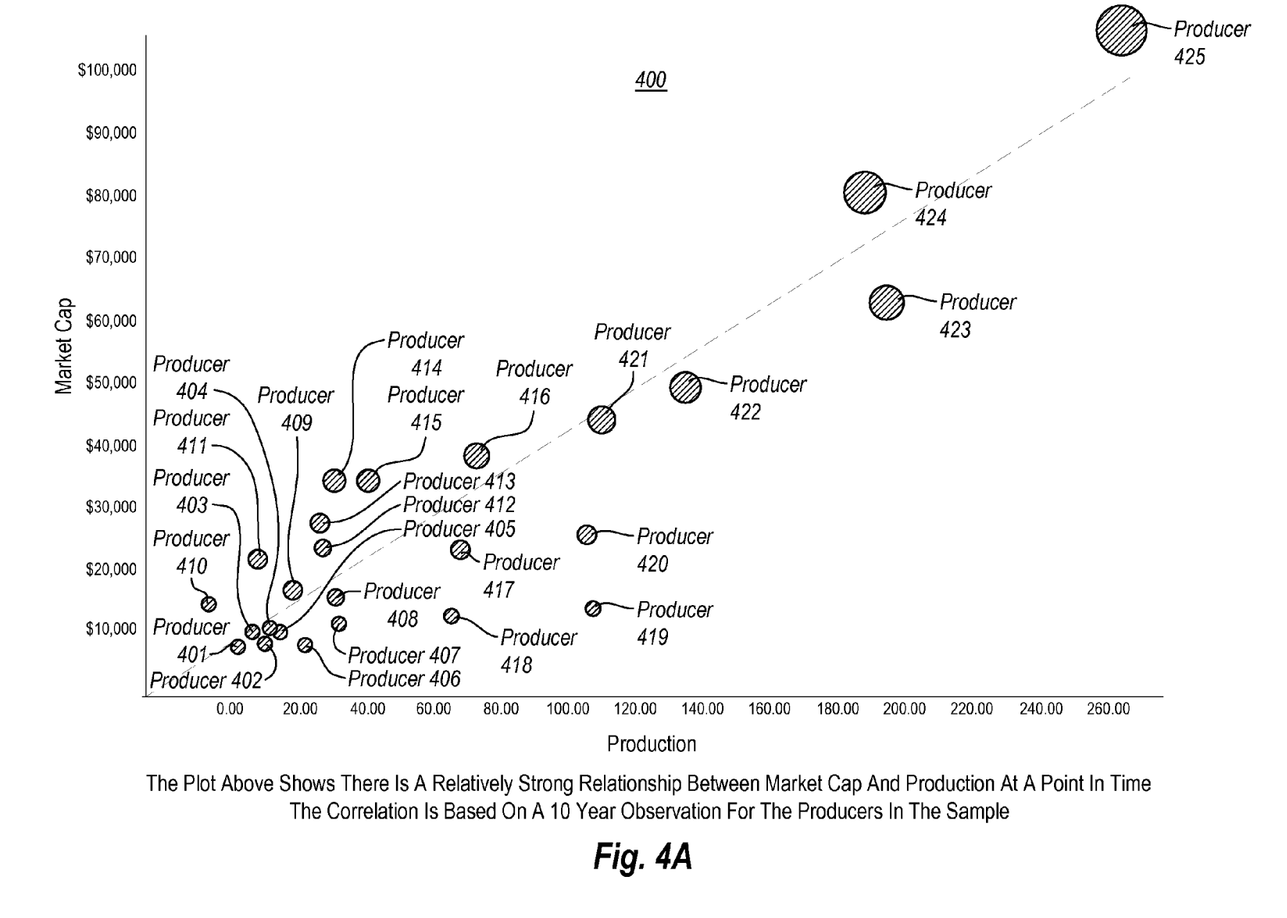
FIG. 4A is a scatter plot that illustrates a correlation between market capitalization and production.

FIG. 4A is a scatter plot 400 that illustrates a correlation between market capitalization and production. In general, there is a relatively strong relationship (e.g., >0.70 correlation) between market capitalization and production at any given point in time. For example, scatter plot 400 depicts a 0.773 correlation between market capitalization and production based on a 10 year observation for petroleum producers 401-425.

Figure 4B:
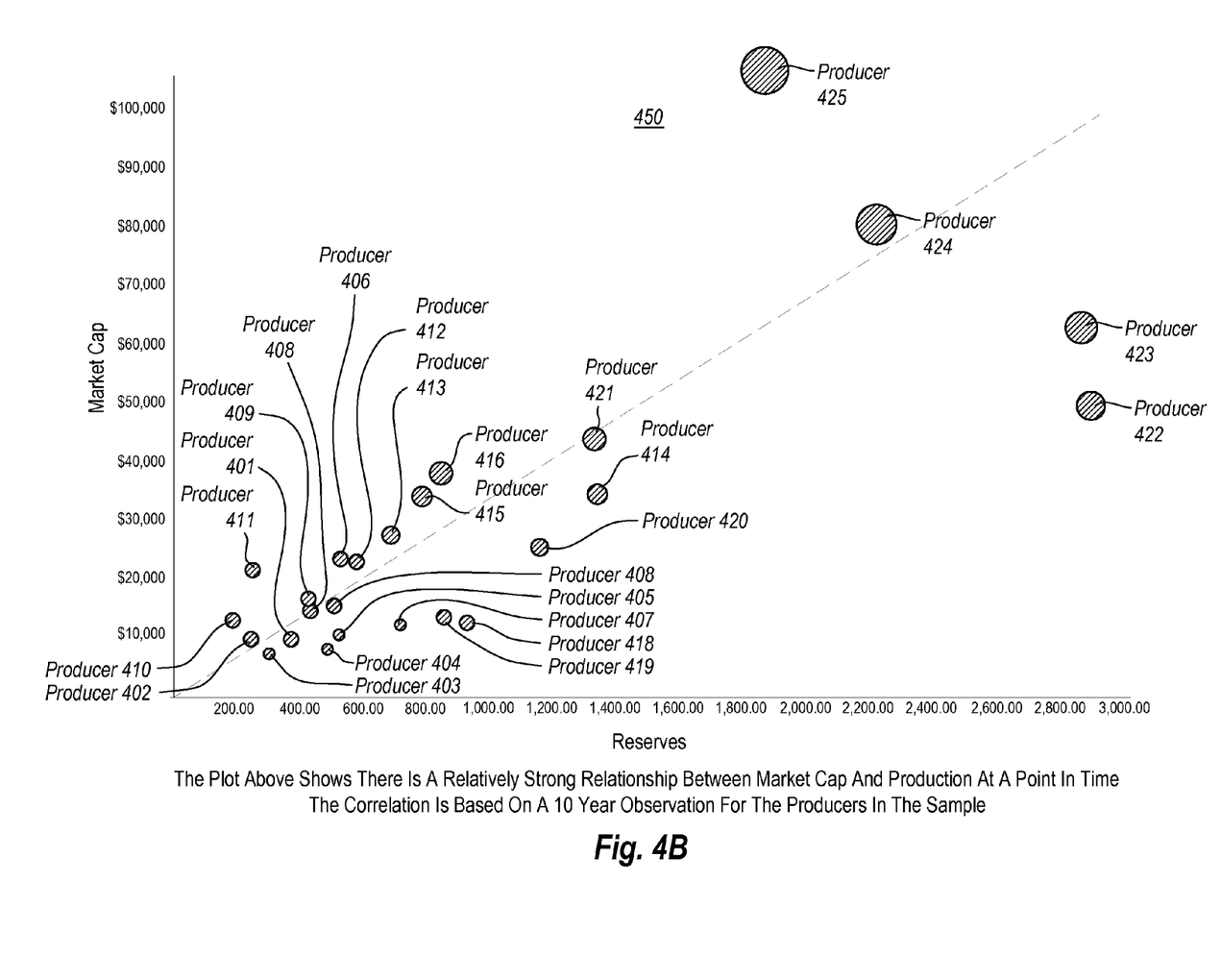
FIG. 4B is a scatter plot that illustrates a correlation between market capitalization and reserves.

FIG. 4B is a scatter plot 450 that illustrates a correlation between market capitalization and reserves. In general, there is a relatively strong relationship (e.g., >0.70 correlation) between market capitalization and at any given point in time. For example, scatter plot 450 depicts a 0.90 correlation between market capitalization and production based on a 10 year observation for petroleum producers 401-425.

Figure 5:
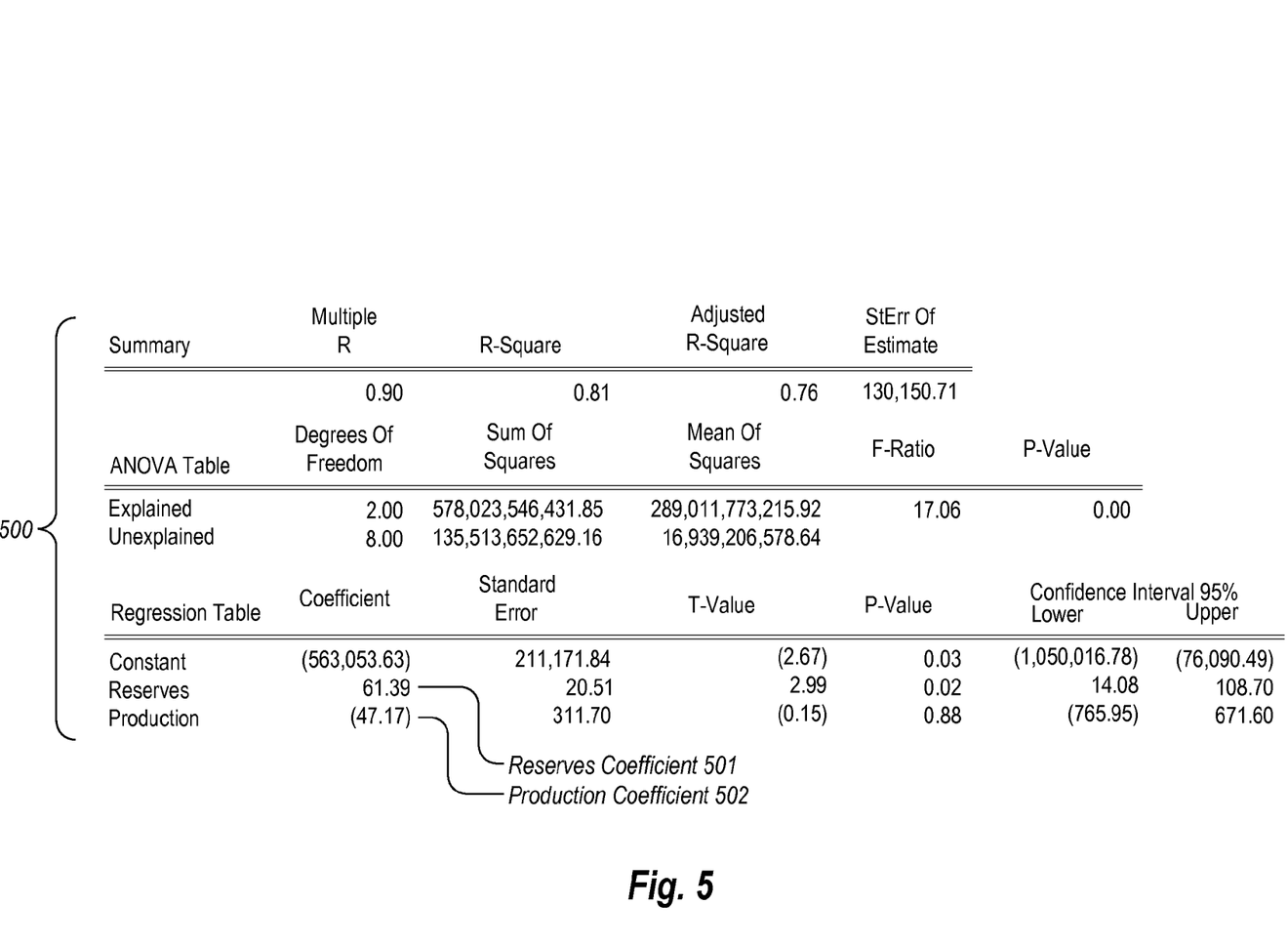
FIG. 5 is a chart illustrating regression coefficients for reserves and production.

FIG. 5 is a chart 500 illustrating regression coefficients for reserves and production. As depicted, reserves coefficient 501 has a value of $61.30/bbl and production coefficient 502 has a value ($47.17/bbl). Based these values, a Reservoir Management Factor™ (RMF™ or β) for a petroleum producer can be calculated as follows:

$$\beta = \text{Sum}(\$61.39/\text{bbl}, -\$47.17/\text{bbl}) = \$14.22/\text{bbl}$$

The Reservoir Management Factor™ (RMF™ or β) represents a factor for calculating a premium to the value of any capital petroleum projects undertaken by the petroleum producer. For example, the petroleum producer may be considering a project to create 740,000 barrels of reserves. The Net Present Value ("NPV") of the project may be $40 million. The True Value Index™ (TVI™) for the project can be calculated as follows:

$$TVI = \$40 \text{ MM} + (\$14.22/\text{bbl} * 740,000 \text{ barrels})$$
$$= \$40 \text{ MM} + (\$10.52 \text{ MM})$$
$$= 50.52 \text{ MM}$$

In short, the present invention provides a simple, yet powerful, diagnostic tool that can be used to quickly and accurately assess the True Value Index™ (TVI™) for a petroleum production capital project. The True Value Index™ (TVI™) accounts for the impact of petroleum producers reserves on valuing project decisions. The inventiveness of the disclosed methods lies in their simplicity and ease of implementation. Although sophisticated managers and operators of petroleum reservoirs have been assessing capital projects for decades, and there has existed a long-felt need for finding improved and more streamlined methods for assessing opportunities for economically increasing petroleum production, those of skill in the art have overlooked and failed to appreciate the powerful diagnostic power and quick implementation of the methods disclosed herein, which satisfy a long-felt need known in the art but heretofore unsatisfied. Moreover, the accuracy by which one may quickly determine a True Value Index™ (TVI™) for a petroleum production capital project is, compared to conventional practices, unpredictable and an unexpected result.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for modifying production of petroleum to increase petroleum production efficiency and/or increase petroleum recovery efficiency of petroleum reservoirs of a petroleum producer, the method comprising:

measuring, using one or more sensors placed in the petroleum reservoirs, data relating to physics and geology of the petroleum reservoir relating to at least one of reservoir pressure, fluid saturations, well productivity and drawdown, fluid profile, oil production, gas production, water production, injection rate, real displacement efficiency, vertical displacement efficiency, and pore displacement efficiency;

determining type, number, location, and efficiency of wells servicing the petroleum reservoirs;

determining a coefficient of reserves based on data obtained by the one or more sensors placed in the petroleum reservoirs and the type, number, location, and efficiency of wells servicing the petroleum reservoirs, the coefficient of reserves having units of monetary amount divided by quantity of petroleum;

determining a coefficient of production based on data obtained by the one or more sensors placed in the petroleum reservoirs and the type, number, location, and efficiency of wells servicing the petroleum reservoirs, the coefficient of production having units of monetary amount divided by quantity of petroleum;

determining a reservoir management factor ($\beta$) for the petroleum reservoirs based on the coefficient of reserves and the coefficient of production;

determining from data obtained by the one or more sensors placed in the petroleum reservoirs and the type, number, location, and efficiency of wells servicing the petroleum reservoirs an additional quantity of proven petroleum reserves (Reserves) to be created by a proposed modification to production of petroleum from the reservoirs;

determining from data obtained by the one or more sensors placed in the petroleum reservoirs and the type, number, location, and efficiency of wells servicing the petroleum reservoirs a net present value (NPV) of the proposed modification to production of petroleum from the reservoirs, the NPV having units of monetary amount;

determining a true value index (TVI) for the proposed modification to production of petroleum from the reservoirs by relating the reservoir management factor ($\beta$), the additional quantity of proven petroleum reserves (Reserves) to be created by the proposed modification to production of petroleum from the reservoirs, and the net present value (NPV) of the proposed modification to production of petroleum from the reservoirs; and based on the true value index (TVI), implementing the proposed modification to production of petroleum from the reservoirs, including manually or automatically modifying operation of one or more production units selected from producing oil wells, water injection wells, gas injection wells, heat injectors, or sub-components thereof, wherein adjusting the operation of the one or more production units is selected from change in volume, change in pressure, change in temperature, change in well bore path, drilling one or more new wells, stimulating one or more existing wells, and/or increasing reservoir contact of one or more existing wells.

2. The method as in claim 1, wherein the true value index (TVI) is determined according to the following equation:

$$TVI=NPV+(\beta*Reserves).$$

3. The method as in claim 1, further comprising using the true value index (TVI) as part of a method for determining the economic feasibility of the proposed modification to production of petroleum from the reservoirs.

4. The method as in claim 1, wherein determining the reservoir management factor ($\beta$) for the petroleum producer comprises determining an absolute sum of:
the coefficient of reserves; and
the coefficient of production.

5. The method as in claim 1, further comprising determining the coefficient of reserves and the coefficient of production based in part from data relating to production of petroleum by the producer included in a 10K filing.

6. The method as in claim 1, further comprising determining the coefficient of production using statistical algorithms and historically observed petroleum production data for a sample set of petroleum producers.

7. The method as in claim 1, further comprising determining the coefficient of reserves using statistical algorithms and historically observed petroleum production data for a sample set of petroleum producers.

8. The method as in claim 1, wherein determining the reservoir management factor ($\beta$) further comprises relating the sum of the coefficient of reserves and the coefficient of production through a multivariable correlation.

9. The method as in claim 8, wherein the reservoir management factor ($\beta$) is determined according to the following equation:

$$\beta=\text{the coefficient of reserves minus the coefficient of production.}$$

10. In a computing system having a processor and system memory, a method for modifying production of petroleum to increase petroleum production efficiency and/or increase petroleum recovery efficiency of petroleum reservoirs of a petroleum producer, the method comprising:

measuring, using one or more sensors placed in the petroleum reservoirs, data relating to physics and geology of the petroleum reservoir relating to at least one of reservoir pressure, fluid saturations, well productivity and drawdown, fluid profile, oil production, gas production, water production, injection rate, real displacement efficiency, vertical displacement efficiency, and pore displacement efficiency;

determining type, number, location, and efficiency of wells servicing the petroleum reservoirs;

inputting into the computing system data relating to the physics or geology of the petroleum reservoirs and the type, number, location, and efficiency of wells servicing the petroleum reservoirs;

the computing system determining a coefficient of reserves based on data obtained by the one or more sensors placed in the petroleum reservoirs and the type, number, location, and efficiency of wells servicing the petroleum reservoirs, the coefficient of reserves having units of monetary amount divided by quantity of petroleum;

the computing system determining a coefficient of production based on data obtained by the one or more sensors placed in the petroleum reservoirs and the type, number, location, and efficiency of wells servicing the petroleum reservoirs, the coefficient of reserves having units of monetary amount divided by quantity of petroleum;

the computing system determining a reservoir management factor ($\beta$) for the petroleum reservoirs based on the coefficient of reserves and the coefficient of production;

the computing system determining from data obtained by the one or more sensors placed in the petroleum reservoirs and the type, number, location, and efficiency of wells servicing the petroleum reservoirs an additional quantity of proven reserves (Reserves) to be created by a proposed modification to production of petroleum from the reservoirs;

the computing system determining from data obtained by the one or more sensors placed in the petroleum reservoirs and the type, number, location, and efficiency of wells servicing the petroleum reservoirs a net present value (NPV) of the proposed modification to production of petroleum from the reservoirs, the NPV having units of monetary amount;

the computing system determining a true value index (TVI) for the proposed modification to production of petroleum from the reservoirs by relating the reservoir management factor ($\beta$), the additional quantity of proven reserves (Reserves) to be created by the proposed modification to production of petroleum from the reservoirs, and the net present value (NPV) of the proposed modification to production of petroleum from the reservoirs;

the computing system generating and displaying one or more reports based on the true value index (TVI); and based on the true value index (TVI), implementing the proposed modification to production of petroleum from the reservoirs, including manually or automatically modifying operation of one or more production units selected from producing oil wells, water injection wells, gas injection wells, heat injectors, or sub-components thereof, wherein adjusting the operation of the one or more production units is selected from change in volume, change in pressure, change in temperature, change in well bore path, drilling one or more new wells, stimulating one or more existing wells, and/or increasing reservoir contact of one or more existing wells.

11. The method as in claim 10, the computing system determining the true value index (TVI) according to the following equation:

$$TVI=NPV+(\beta*Reserves).$$

12. The method as in claim 10, further comprising the computing system determining the coefficient of reserves and the coefficient of production at based in part from data relating to production of petroleum by the producer included in a 10K filing.

13. The method as in claim 10, further comprising the computing system determining the coefficient of production using statistical algorithms and historically observed petroleum production data for a sample set of petroleum producers.

14. The method as in claim 10, further comprising the computing system determining the coefficient of reserves using statistical algorithms and historically observed petroleum production data for a sample set of petroleum producers.

15. The method as in claim 10, the computing system determining the reservoir management factor ($\beta$) according to the following equation:

$$\beta=\text{the coefficient of reserves minus the coefficient of production.}$$

16. The method as in claim 10, wherein the petroleum producer is a publicly traded corporation and wherein the reservoir management factor ($\beta$) reflects a market premium on increased reserves.

17. The method as in claim 10, wherein the coefficient of reserves and the coefficient of production are regression coefficients.

18. A method for implementing a new capital project to increase petroleum production efficiency and/or increase petroleum recovery efficiency of a petroleum reservoir of a petroleum producer, the method comprising:

performing detailed analyses of physics and geology of the petroleum reservoir, the detailed analyses comprising performing one or more physical processes, and using one or more machines to perform the one or more physical processes, which are selected from:
coring to obtain down-hole rock samples and performing analysis thereof,
taking down-hole fluid samples of oil, water and gas and performing analysis thereof,
measuring initial pressures from radio frequency telemetry or like devices and performing analysis thereof, and
measuring fluid saturations and performing analysis thereof;

formulating, based in part on the detailed analyses of the petroleum reservoir and in part on an analysis of petroleum production by the producer, a reservoir management factor ($\beta$) having units of monetary amount divided by quantity of petroleum for the petroleum producer, including;
determining, based on the detailed analyses of the petroleum reservoir and the petroleum production by the producer, a coefficient of reserves for the petroleum producer having units of monetary amount divided by quantity of petroleum;
determining, based on the detailed analyses of the petroleum reservoir and the petroleum production by the producer, a coefficient of production for the petroleum producer having units of monetary amount divided by quantity of petroleum; and
relating together the coefficient of reserves and the coefficient of production to obtain the reservoir management factor ($\beta$);

determining based in part on the detailed analyses of the petroleum reservoir and in part on an analysis of the petroleum production by the producer a new quantity of P1 reserves (Reserves) to be created by the new capital project;

determining based in part on the detailed analyses of the petroleum reservoir and in part on an analysis of the petroleum production by the producer a net present value (NPV) of the new capital project, the NPV having units of monetary amount;

determining a true value index (TVI) for the new capital project by relating the reservoir management factor ($\beta$), the new quantity of P1 reserves (Reserves) to be created by the new capital project, and the net present value (NPV) of the new capital project, the true value index (TVI) providing an evaluation of the capital project based on both petroleum production factors and petroleum reserves factors and having units of monetary amount; and implementing the new capital project, including manually or automatically modifying operation of one or more production units selected from producing oil wells, water injection wells, gas injection wells, heat injectors, or sub-components thereof, wherein adjusting the operation of the one or more production units is selected from change in volume, change in pressure, change in temperature, change in well bore path, drilling one or more new wells, stimulating one or more existing wells, and/or increasing reservoir contact of one or more existing wells.

19. The method as in claim 1, wherein the coefficient of reserves and the coefficient of production are regression coefficients.

20. The method as in claim 18, wherein the new capital project comprises at least one of: (1) drilling one or more additional wells, (2) stimulating one or more existing wells, or (3) increasing reservoir contact of one or more existing wells.

* * * * *

UNITED STATES PATENT AND TRADEMARK OFFICE
CERTIFICATE OF CORRECTION

PATENT NO. : 9,767,421 B2
APPLICATION NO. : 13/282297
DATED : September 19, 2017
INVENTOR(S) : Saleri et al.

Page 1 of 1

It is certified that error appears in the above-identified patent and that said Letters Patent is hereby corrected as shown below:

In the Specification

Column 6
[Line 12] Change "at producing" to --at a producing--

Column 7
[Line 55] Change "Transmissions media" to --Transmission media--
[Lines 56-57] Change "used to carry or desired program" to --used to carry a desired program--

Signed and Sealed this
Fifteenth Day of May, 2018

Andrei Iancu
*Director of the United States Patent and Trademark Office*